I. W. HODGSON.
STAIRWAY.
APPLICATION FILED JUNE 11, 1919.
1,412,406.
Patented Apr. 11, 1922.
2 SHEETS—SHEET 1.
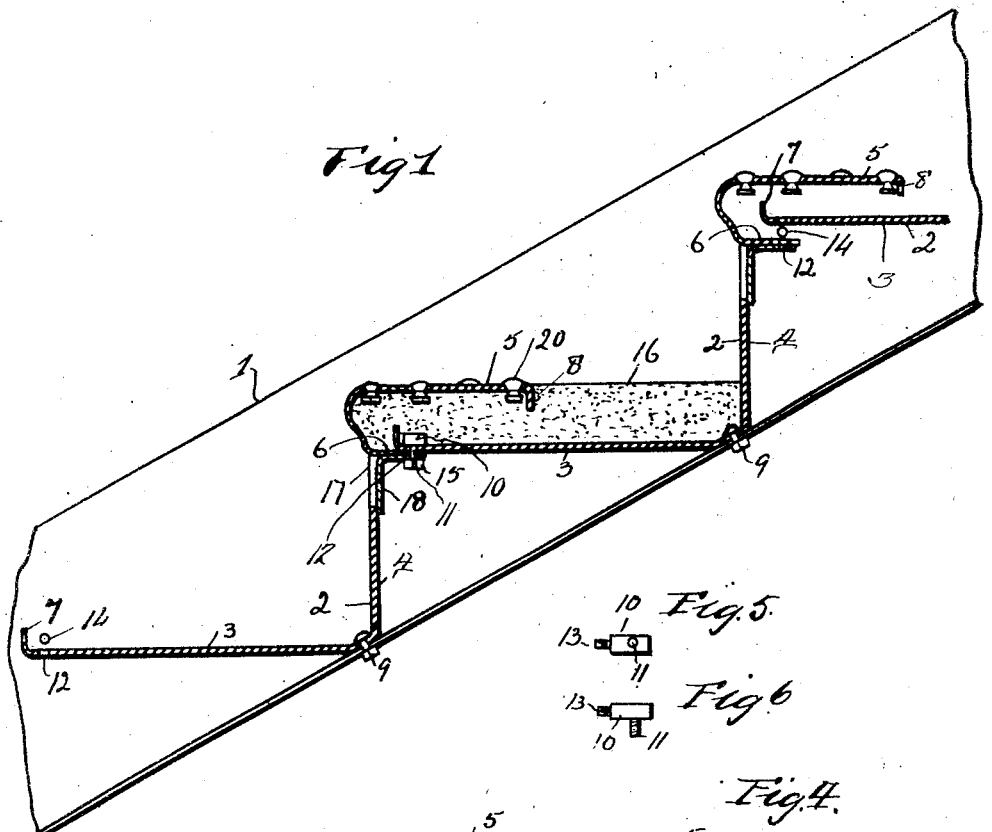
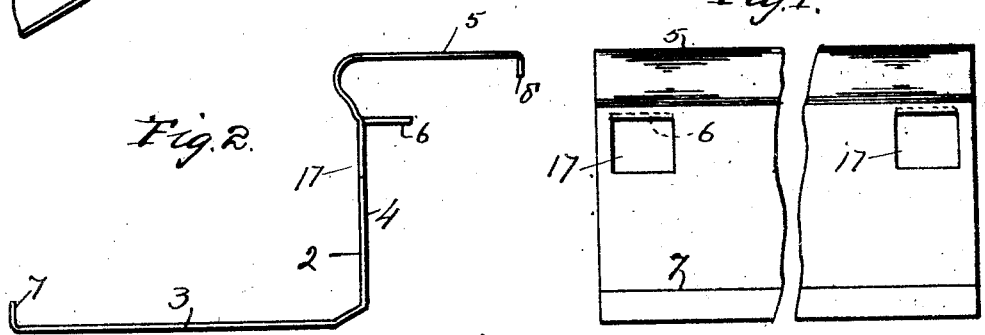
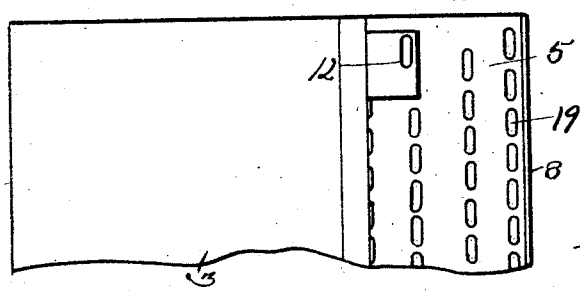
Inventor
Isaac W. Hodgson
By W. W. Williamson
Atty.

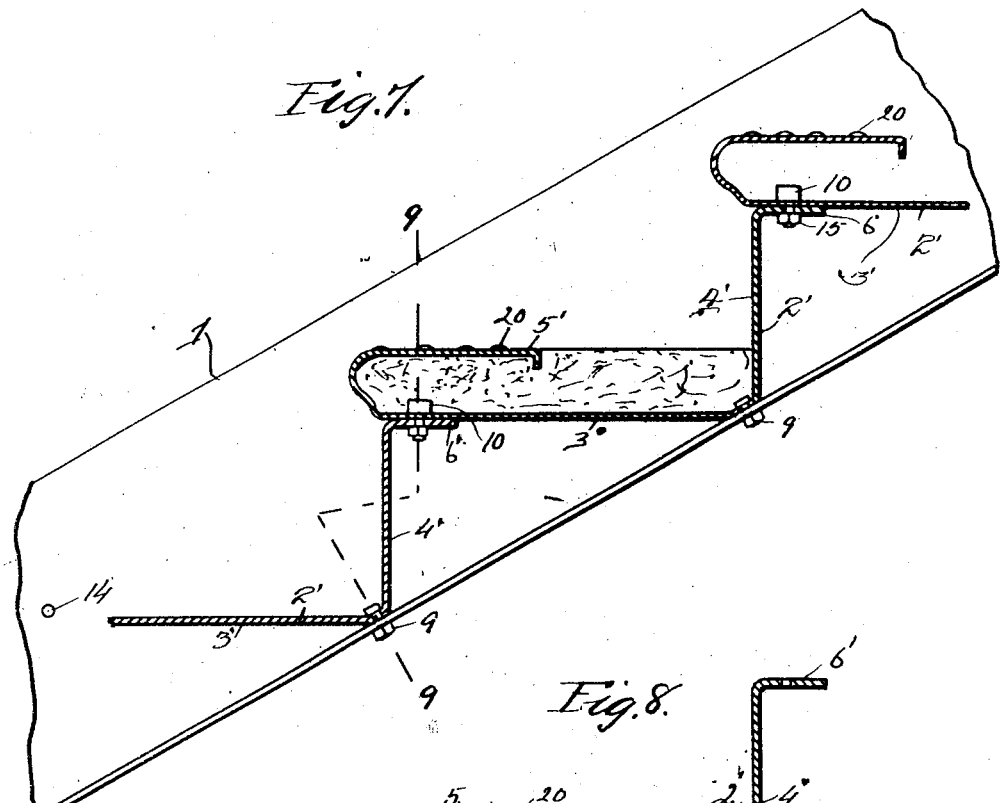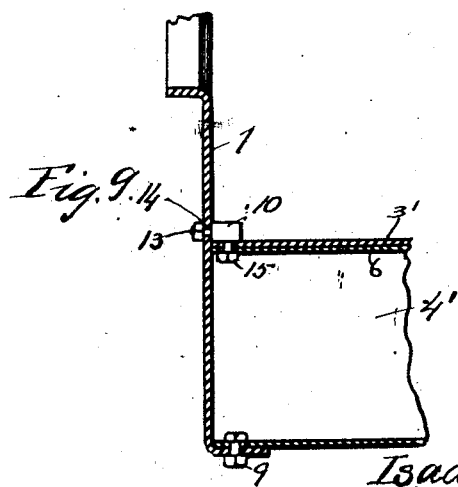

UNITED STATES PATENT OFFICE.

ISAAC W. HODGSON, OF PHILADELPHIA, PENNSYLVANIA, ASSIGNOR OF ONE-HALF TO M. J. McDONNELL, OF PHILADELPHIA, PENNSYLVANIA.

STAIRWAY.

1,412,406.

Specification of Letters Patent.   Patented Apr. 11, 1922.

Application filed June 11, 1919.   Serial No. 303,299.

*To all whom it may concern:*

Be it known that I, ISAAC W. HODGSON, a citizen of the United States, residing at Philadelphia, in the county of Philadelphia and State of Pennsylvania, have invented new and useful Improvements in Stairways, of which the following is a specification.

My invention relates to a new and useful improvement in stairways, and has for its object to so arrange and construct stairs that a secondary tread is produced by a continuation of either the primary tread or the riser, and the secondary tread being of less width than the primary tread and in a higher plane thus providing for the completion of each tread by filling in with cement or other suitable material.

A further object of my invention is to utilize the secondary tread as a non-slip section.

A still further object of my invention is to form a primary tread, a riser and a secondary tread as one unit so constructed that these units may be readily secured together and attached to the stringer to produce the completed stairway.

With these ends in view, this invention consists in the details of and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Fig. 1, is a vertical section of a portion of a stairway showing one portion therein completed and other portions in different stages of assembly.

Fig. 2, is a side elevation of one of the metal units from which the stairway is constructed.

Fig. 3, is a bottom plan view of Fig. 2, a portion thereof being broken away.

Fig. 4, is a front elevation of Fig. 2.

Fig. 5, is a bottom plan of one of the coupling members.

Fig. 6, is a side view of Fig. 5.

Fig. 7, is a view similar to Fig. 1 of a slightly modified form of my invention.

Fig. 8, is a detail view of one of the units of which the stairway shown in Fig. 7 is composed, and Fig. 9, is a section at the line 9—9 of Fig. 7.

In carrying out my invention as embodied in Figs. 1 to 6 inclusive, 1 represents one of the side stringers of a stairway which is in the form of an angle iron, and 2 represents one of the units of which the stairway is composed and each of these units consists of a primary tread 3, a riser 4, a secondary tread 5 and brackets 6, the brackets being here shown as being formed from tongues partially cut from the riser and bent inward to a horizontal position. There may be two or more of these brackets as occasion may require.

Lips 7 and 8 may be formed with the primary tread 3 and the secondary tread 5 respectively to serve as anchors for the cement or other material when applied to the metal work.

In constructing a stairway from a number of these units 2 one of said units is first secured upon the stringers by suitable bolts 9 and the next unit likewise being secured upon said stringers in such manner as to bring the primary tread thereof on top of the brackets 6 of the first unit. This primary tread is secured to the brackets and stringer by the coupling members 10 by passing the threaded shank 11 of each of said coupling members through a suitable hole in the primary tread downward through one slot 12 in one of the brackets and then sliding said coupling member in the direction of the length of the slot until the threaded shank 13 passes through one of the holes 14 formed in the stringers, when by running a nut upon the threaded shank 13 and a nut 15 upon the threaded shank 11 the two units will not only be coupled together but rigidly secured to the stringers. By continuing this process the proper number of units may be secured upon the stringers and coupled together to produce the stairway after which the filling 16 consisting of cement or other suitable material may be applied to the treads, and where the filling consists of cement it is poured upon each tread and flows under the secondary tread locking the parts together and giving added strength and rigidity to the completed structure.

The openings 17 formed in the risers by the inturning of the brackets 6 may be closed by shields 18 held in place by the nuts 15.

The secondary treads 5 have a series of slots 19 formed therethrough, which slots are preferably staggered relative to each other, and in these slots are set plugs 20 of any suitable non-slipping material, thus giving to the stairway a non-slipping quality. When these plugs become worn they may be removed by digging them out of their sockets and others may be substituted therefor.

From the foregoing it will be seen that an exceedingly simple and effective construction is utilized for erecting metal stairways and the material for which may be entirely fabricated at the factory and quickly and rigidly assembled thus saving time and expense and producing a superior structure.

In Figs. 7 to 9 inclusive I have shown a slightly modified form of my invention in which each of the units 2' is also composed of the primary tread 3', the riser 4', the secondary tread 5' and the bracket 6', but in this construction this bracket is formed by a continuation of the riser 4' standing at right angles to the latter and the secondary tread 5' is formed by a continuation of the primary tread instead of a continuation of the riser 4'.

While my improvement is especially adapted for the utilization of sheet metal in the construction of stairways, it is obvious that the units might be cast or otherwise formed.

Of course I do not wish to be limited to the exact details of construction as herein shown, as these may be varied within the limits of the appended claim without departing from the spirit of my invention.

Having thus fully described my invention, what I claim as new and useful is:—

In a stair construction, a unit formed from a single sheet of metal so bent as to produce a primary tread, a riser projecting from one or the rear edge thereof, a bracket projecting from the upper end of the riser in a direction opposite to the primary tread and a perforated secondary tread projecting from the opposite front edge of the primary tread and overlying the same in parallel spaced relation thereto, the perforations in said secondary tread adapted to hold suitable non-slipping devices.

In testimony whereof, I have hereunto affixed my signature.

ISAAC W. HODGSON.